United States Patent [19]
Kishi et al.

[11] Patent Number: 4,831,235
[45] Date of Patent: May 16, 1989

[54] AUTOMATIC WELDING MACHINE TORCH MOVEMENT CONTROL SYSTEM

[75] Inventors: Hajimu Kishi, Hino; Shinsuke Sakakibara, Komae; Haruyuki Ishikawa, Shinjuku, all of Japan

[73] Assignee: Fanuc Ltd., Minamitsuru, Japan

[21] Appl. No.: 871,415

[22] PCT Filed: Sep. 26, 1985

[86] PCT No.: PCT/JP85/00532
§ 371 Date: May 21, 1986
§ 102(e) Date: May 21, 1986

[87] PCT Pub. No.: WO86/02029
PCT Pub. Date: Apr. 10, 1986

[30] Foreign Application Priority Data
Sep. 27, 1984 [JP] Japan .................. 59-202347

[51] Int. Cl.⁴ ........................... B23K 9/12
[52] U.S. Cl. .................. 219/125.12; 901/42
[58] Field of Search .......... 219/125.1, 125.12; 901/42

[56] References Cited
U.S. PATENT DOCUMENTS

| | | | |
|---|---|---|---|
| 4,150,329 | 4/1979 | Dahlstrom | 219/125.1 |
| 4,350,868 | 9/1982 | Takagi et al. | 219/137 R |
| 4,368,375 | 1/1983 | Merrick et al. | 219/125.12 |
| 4,621,333 | 11/1986 | Watanabe | 219/125.12 |
| 4,677,276 | 6/1987 | Nio et al. | 219/125.12 |

FOREIGN PATENT DOCUMENTS

| | | | |
|---|---|---|---|
| 0076498 | 4/1988 | European Pat. Off. | |
| 2317995 | 7/1976 | France | |
| 52-11651 | 4/1977 | Japan | |
| 52-56044 | 5/1977 | Japan | 219/125.12 |

Primary Examiner—Clifford C. Shaw
Attorney, Agent, or Firm—Staas & Halsey

[57] ABSTRACT

A welding control system in an automatic welding machine controls the movement of a torch (TC) such that while the torch is weaving along a welding line (CT), the torch is moved under the control of a control device (3). The amplitudes on the lefthand side (aL) and righthand side (aR) of a welding line are based on independent commands. The welding control system can provide a weaving pattern according to the manner in which a desired workpiece is to be welded.

7 Claims, 5 Drawing Sheets

AUTOMATIC WELDING MACHINE TORCH MOVEMENT CONTROL SYSTEM

BACKGROUND OF THE INVENTION

1. Field of the Invention

The present invention relates to a welding control system in an automatic welding machine, and more particularly to a welding control system in an automatic welding machine, which can obtain a weaving pattern suitable for a workpiece to be welded.

2. Description of the Related Art

Arc welding machines operate by applying a voltage between a wire and a workpiece to be welded to produce an arc from the distal end of the wire, causing the wire and the workpiece to be melted at a low rate by the heat generated by the arc, and moving the distal end of the wire along a welding path while feeding out the wire continuously at a slow rate, for thereby welding the workpiece. FIG. 6 of the accompanying drawings schematically shows such an arc welding machine. In FIG. 6, a wire WR is fed by rollers FR in small increments in the direction of the arrow, and passes through a guide member GB to project from the distal end of a torch TC. The rate of feed of the wire WR is limited such that the distal end of the wire will be spaced a prescribed distance from the surface of a workpiece WK to be welded. The positive potential of a high voltage which is generated by a welding power supply PS is applied to the wire WR through the guide member GB, whereas the negative potential is connected to the workpiece WK. A gas is supplied from a gas supply (not shown) in the direction of the arrows through the torch TC and applied to the workpiece WK to prevent a welded area from being oxidized. When the gas is supplied from the gas supply and the high voltage is generated by the welding power supply PS while the wire is fed out in small increments, an arc is produced from the distal end of the wire, and the wire and the workpiece are melted such that the melted portion is integrally welded. Such a welding operation is performed by a robot. More specifically, the torch of the welding machine is gripped by the robot, and the torch (distal end of the wire) is moved by the robot along a welding path to weld the desired portion. In order to enable the robot to weld the workpiece, it is necessary to teach the robot the path or positions to which the torch is to be moved and the speed at which the torch is to be moved.

For welding the workpiece according to the taught positional data, it is the recent practice to provide a soft weaving ability achieved by composite motion produced by movements about 6 axes of the robot, i.e., a turn axis, an upper arm axis, a lower arm axis, and wrist axes.

FIG. 7 is a diagram showing, by way of example, a weaving pattern of soft weaving accomplished by the robot. For performing such weaving movement, a weaving command format in the program is indicated as (G81, 1, f, a)

where G81 indicates a weaving command, 1 a number for denoting the weaving pattern (the pattern shown in FIG. 7), f a weaving frequency, and a a weaving amplitude. The weaving movement is limited to the pattern shown in FIG. 7 in which the weaving amplitude a remains the same on both sides of a central welding line CT. With this weaving movement, therefore, a welding material M is applied only uniformly on both sides of the central welding line of the workpiece WK as shown in FIGS. 8 and 9.

With more demands for complex motions of robots, a welding robot may be required to effect such a weaving movement as to cause a welding material to be applied in a manner to be displaced to one side with respect to the central welding line. Although there are various reasons for such a weaving movement, typical examples are that when different metals are to be welded, or due to the shape of an area to be welded, the welding material may be displaced to one side to weld the workpiece more firmly on such one side.

However, the above weaving movement cannot heretofore been performed by welding robots.

SUMMARY OF THE INVENTION

It is an object of the present invention to provide a welding control system in an automatic welding machine, which is capable of applying a welding material to an area to be welded according to the manner in which the area is to be welded.

According to the present invention, there is provided a welding control system in an automatic welding machine having a control device for controlling the distal end of a torch to move while weaving along a welding line, wherein the control device controls the torch to move based on independent commands for amplitudes of the torch on the lefthand and righthand sides of the welding line.

Since the torch amplitudes are controlled on the basis of the independent commands on the lefthand and righthand sides of the welding line when the torch is to weave, a welding material can be applied in different ways according to the manner in which the desired portion of a workpiece is to be welded. Therefore, the workpiece can be welded quickly and accurately according to the manner in which the desired workpiece portion is to be welded.

DESCRIPTION OF THE PREFERRED EMBODIMENT

An embodiment of the present invention will hereinafter be described in specific detail with reference to the drawings.

Figure 4:
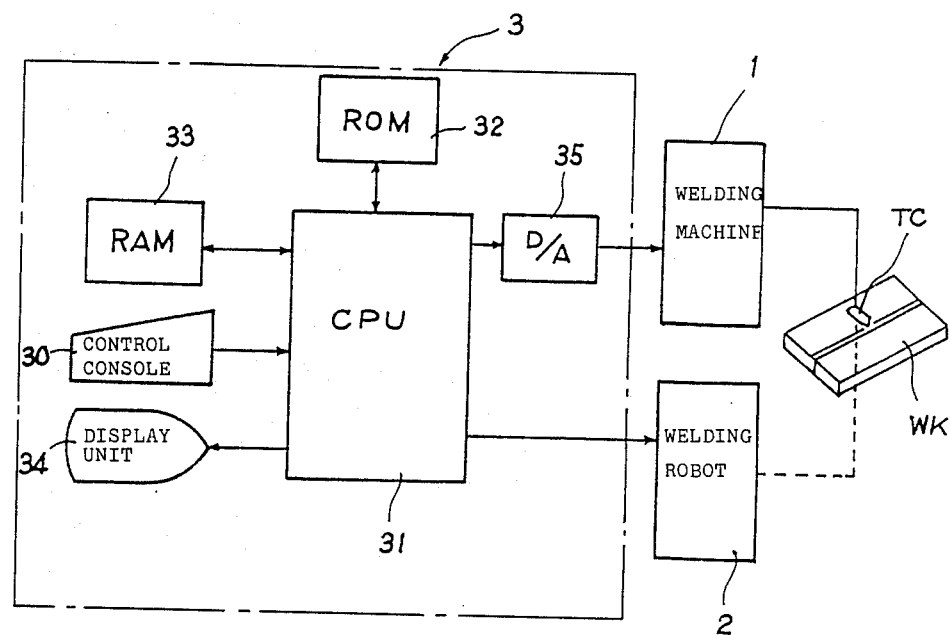
FIG. 4 is a block diagram schematically illustrating a welding robot.
Figure 7:
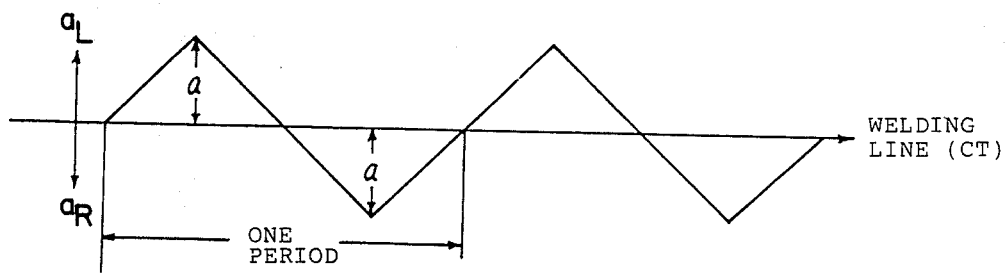
FIG. 7 is a diagram explanatory of a conventional weaving pattern.
Figure 8:
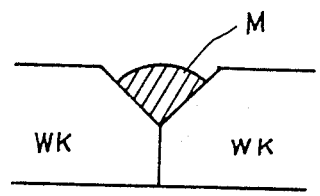
FIGS. 8 and 9 are diagrams showing portions of a workpiece welded by a conventional welding control system.
Figure 9:
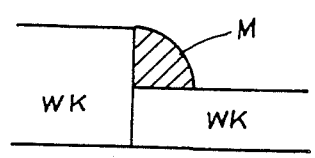

FIG. 4 is a block diagram schematically showing a welding robot. Denoted at 1 is a welding machine and 2 a welding robot having a hand holding a torch TC of the welding machine for moving the torch TC on a workpiece WK according to taught data. Designated at 3 is a numerical control device for controlling the welding machine 1 and the welding robot 2. The numerical control device 3 has a central processing unit (CPU) 31 for controlling the overall numerical control device and effecting arithmetic operations, a read-only memory (ROM) 32 storing a control program and the like, a random-access memory (RAM) 33 for temporarily storing various data such as taught data for the welding robot, a control console 36 for entering various welding conditions and teaching the welding robot the welding operations, a display unit 34 for displaying the present position of the torch TC and a program list and data, and a digital/analog converter 35 for converting digital commands from the CPU 31 to analog commands and applying the analog commands to the welding machine 1.

Figure 1:
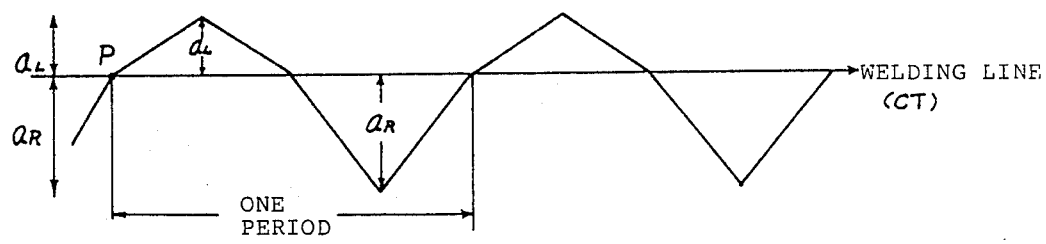
FIG. 1 is a diagram explanatory of a weaving pattern according to the present invention.
Figure 2:
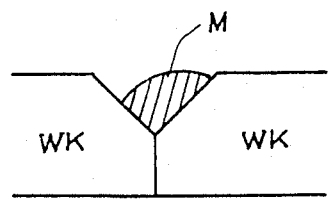
FIGS. 2 and 3 are diagrams of welded portions of a workpiece.
Figure 3:
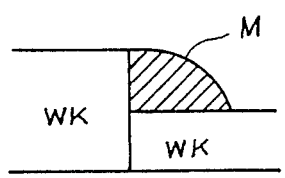

FIG. 1 is a diagram showing, by way of example, a weaving pattern used in a welding control system according to the present invention, and FIGS. 2 and 3 are diagrams of welded portions provided by the welding control system shown in FIG. 1.

As is apparent from FIG. 1, the welding control system according to the present invention employs a weaving command format capable of independently designating amplitudes on a lefthand side aL and a righthand side aR of a welding line CT when a welding operation using a weaving pattern is to be carried out.

To this end, the following weaving command format is used to independently designate the amplitudes on the lefthand side aL and the righthand side aR of the welding line CT:

G81, 1, f, aL, aR

The designation "G81" in the above weaving command format represents a weaving command for straight movement of the torch TC. The number "1" represents a number for designating the weaving pattern. As shown in FIG. 1, this weaving pattern causes the torch TC to move in a triangular pattern across the welding line CT. The letter "f" indicates a weaving frequency of the torch TC and commands a weaving cycle number per second in the unit of 0.1 Hz. For example, if the cycle is to be effected 10 times per ten seconds, then "f" commands 10. The designation "aL" indicates the amplitude value on the lefthand side, whereas "aR" indicates the amplitude value on the righthand side.

Figure 5:
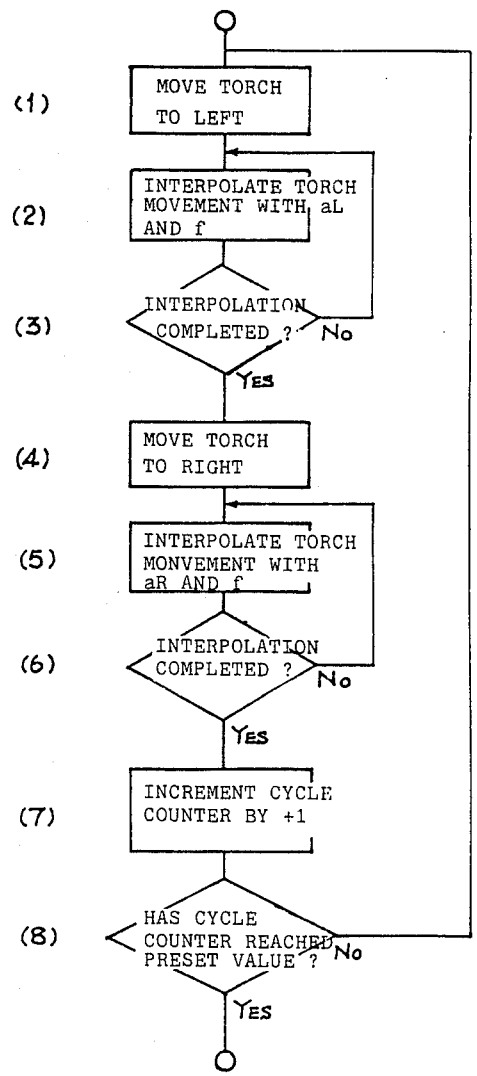
FIG. 5 is a flowchart of the operations of the invention.
Figure 6:
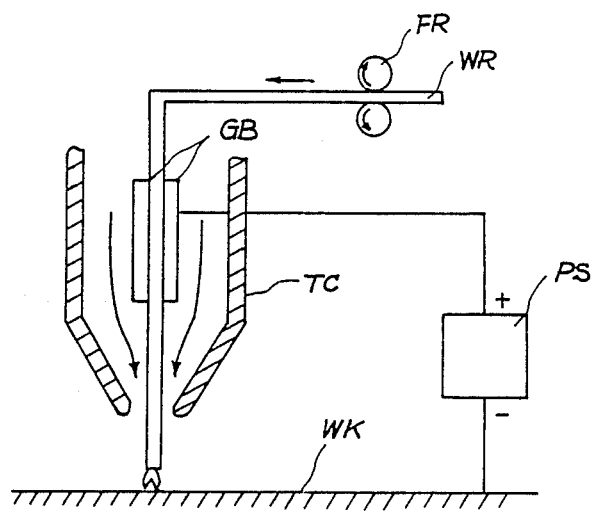
FIG. 6 is a schematic view of an automatic welding machine.

A welding operation effected by using the above weaving command format will be described with reference to the flowchart of FIG. 5.

It is assumed that prior to effecting the welding operation, all necessary data such as positional data for the welding line CT, a weaving command format for commanding weaving movement, and the like have already been learned by the welding robot, the torch TC has finished its initial motion, the torch TC is positioned at a point P in FIG. 1 on its movement, and the torch TC is to move from this position.

In a step (1), the torch TC starts to be moved from the point P to the left. This movement is linearly interpolated in a step (2) by using wo data items, i.e., the frequency f and the lefthand-side amplitude aL which are designated by the weaving command format, so that the path followed by the torch TC is of a triangular shape. The triangular shape has its peak equal to aL.

When this interpolation is completed in a step (3), the torch TC starts to be moved to the right in a step (4). This movement is linearly interpolated in a step (5) by using two data items, i.e., the frequency f and the righthand-side amplitude aR which are designated by the weaving command format, so that the path followed by the torch TC is likewise of a triangular shape. The triangular shape has its peak equal to aR.

When this interpolation is completed in a step (6), a cycle counter in the CPU 31 is incremented by +1 in a step (7). The above cycle is repeated a preset number of times. When the cycle counter has reached a preset value in a step (8), one weaving welding movement is finished.

According to the commanded soft weaving, the weaving pattern produced is as shown in FIG. 1, in which the frequency remains the same and the amplitudes aL and aR on the lefthand and righthand sides respectively are different from each other.

A welding operation effected by such weaving movement causes a welding material M to be applied more on the righthand side of the welding line as shown in FIGS. 2 and 3.

FIGS. 2 and 3 are diagrams explanatory of such welding operation. In FIG. 2, the welding material M is applied more on the righthand side of a V groove to be welded. In FIG. 3, the welding material M is applied more on the righthand side of an L shape to be welded.

According to the present invention, as described above, the amplitudes of a torch are controlled in weaving based on independent commands on the lefthand and righthand sides of a welding line. Therefore, a welding material can be applied in different ways according to the manner in which a desired portion is to be welded. The workpiece can be welded quickly and accurately according to the manner in which the desired workpiece portion is to be welded.

A welding control system according to the present invention can provide soft weaving patterns, and hence is suitable for use with a welding robot having a soft weaving ability.

We claim:

1. A welding control system in an automatic welding machine comprising:
   a torch;
   input means for inputting independent input commands; and
   a control device for controlling a weaving motion of the torch along a welding line based on the independent input commands for parameters of the weaving motion for a workpiece being welded, the commands being part of a weaving command format:

G81, 1, f, aL, aR where
   G81 represents a weaving command;
   1 designates a weaving pattern;
   f designates a weaving frequency for the torch;
   aL represents an amplitude on the lefthand side of the welding line; and
   aR represents an amplitude on the righthand side of the welding line.

2. A welding control system according to claim 1, wherein said torch is operated by a welding robot controlled by said control device.

3. A welding control system in an automatic welding machine comprising:
   a torch;

input means for inputting independent input commands; and a control device for controlling a weaving motion of the torch along a welding line based on the independent input commands for parameters of the weaving motion for a workpiece being welded, said independent input commands comprising a weaving command for designating a desired torch movement, a weaving pattern command for designating a weaving pattern, a frequency command for designating a weaving frequency per second, a lefthand amplitude command for designating an amplitude of the torch on a lefthand side of the welding line, and a righthand amplitude command for designating an amplitude of the torch on a righthand side of the welding line.

4. A welding control system for adjusting an automatic welding machine having a torch for each workpiece to be welded, the system comprising:

data entry means for entering welding data and commands for a welding operation to be performed, the commands including amplitude commands for setting maximum distances for the torch to move on lefthand and righthand sides of a welding line;

temporary memory means for temporarily storing the entered welding data and the commands;

permanent memory means for storing welding control programs and welding control data;

processing means for controlling operation of the automatic welding machine based on the welding data and commands stored in said temporary memory means according to the welding control programs and data stored in said permanent memory means; and display means for displaying welding operations data.

5. A welding control system according to claim 4, wherein said system further comprises a welding robot for operating the torch, said robot controlled by commands from said processing means.

6. A welding control system according to claim 4, wherein said commands comprise:

a weaving command for designating a desired torch movement;

a weaving pattern command for designating a weaving pattern;

a frequency command for designating a weaving frequency per second;

a lefthand amplitude command for designating an amplitude of the torch on the lefthand side of the welding line; and a righthand amplitude command for designating an amplitude of the torch on the righthand side of the welding line.

7. A method for realizing a weaving pattern of a torch, suitable for a workpiece to be welded, operated by a welding robot controlled by a welding control system, the robot having been taught positional data for a welding line, a weaving command format, and the torch being positioned at a starting point, said method comprising the steps of:

inputting a weaving command representing movement of the torch;

inputting a weaving pattern;

inputting a desired weaving frequency;

inputting a lefthand side amplitude value;

inputting a righthand side amplitude value; and moving the torch based on the input weaving command, the input weaving pattern, the input weaving frequency, the input lefthand amplitude and the input righthand amplitude.

* * * * *